May 19, 1942.  L. COOPER ET AL  2,283,316

ONE-STAGE PROCESS FOR THE MANUFACTURE OF RUBBER

Filed Oct. 25, 1938

INVENTOR.
Lester Cooper
Dudley Roberts
BY Ostrolenk & Greene
ATTORNEYS

Patented May 19, 1942

2,283,316

UNITED STATES PATENT OFFICE 2,283,316

ONE-STAGE PROCESS FOR THE MANUFACTURE OF RUBBER

Lester Cooper, Milford, Conn., and Dudley Roberts, New York, N. Y., assignors to Rubatex Products, Inc., New York, N. Y., a corporation of Delaware Application October 25, 1938, Serial No. 236,868

4 Claims. (Cl. 18—53)

Our invention relates to a novel one-stage process for the manufacture of closed cell gas expanded rubber and, more particularly, our process relates to a method of incorporating in rubber a chemical blowing agent, shaping the rubber into a miniature size of the final form of the desired object, subjecting this miniature to heat to effect the evolution of gas from chemical blowing agent and to vulcanize the rubber while the miniature is held in a final mold, and releasing the vulcanized and gassed miniature to allow it to expand to the desired size.

Open celled or sponge rubber is well known in the art. It has been manufactured by incorporating blowing agents, such as carbonates, etc., which decompose under heat to evolve carbon dioxide and blow rubber so that a series of intercommunicating open cells are formed throughout the rubber. For many purposes, such as insulation, flotation and construction materials, this open celled rubber is undesirable, inasmuch as it absorbs moisture and transmits gases and further has a relatively low degree of resilience.

Because of these deficiencies in open celled or sponge rubber it has been found advisable to use closed cell gas expanded rubber in which the cells, instead of being in the shape of inter-communicating open channels, are closed sealed cells or bubbles of inert gas, such as nitrogen, which expand homogeneously throughout the mass and form a rubber material which is inherently water-tight and water-resistant, completely resistant to the passage of vapors or fluids of any nature, resilient to a high degree and possessed of very desirable insulating properties, both with respect to heat and sound.

Such closed cell gas expanded rubber has generally been manufactured by means of external gassing in accordance with which rubber is subjected to an inert gas, such as nitrogen, under a pressure of from 3000 to 5000 pounds per square inch in an autoclave. It has required such high pressures to impregnate rubber with gas. This method of forming closed cell rubber by external gassing involves the use of expensive equipment and relatively long periods of time. In the co-pending application of Roberts, Bascom and Cooper, Serial No. 159,706, filed August 18, 1937, there is described a method of forming closed cell rubber by incorporating in the rubber a chemical blowing agent adapted to decompose to evolve gas, concurrently with the use of certain controls which insure the desired closed cell structure as against the old open celled or sponge structure known hitherto. The methods set forth in that application of forming closed cell rubber by means of a chemical blowing agent involve multi-stage processes that necessitate a multiplicity of molds and lengthy time periods.

We have devised a novel process which greatly simplifies the manufacture of closed cell rubber using chemical blowing agents. According to the process of the present invention there is but one molding step and one heating step. This is in marked contrast to the prior methods of forming closed cell gas expanded rubber and is of great economic importance. It can well be understood that the elimination of operations and steps in the manufacture of a product such as closed cell gas expanded rubber effects great savings and is of commercial importance.

According to our process we mix with rubber suitable modifying agents and a chemical blowing agent preferably adapted to release an inert gas, such as nitrogen, or a mixture of gases, such as nitrogen and ammonia, or any similar combination of inert gases, preferably such gases as are insoluble in rubber and do not tend to diffuse out from rubber into the air. The chemical blowing agent is preferably in the form of a finely divided material that may be homogeneously dispersed throughout the rubber to effect a uniform distribution of the chemical blowing agent throughout the rubber mass. After the chemical blowing agent has been thoroughly dispersed throughout the rubber, the rubber is shaped in any desired manner, as by extrusion, cutting or die cutting, etc., to substantially the particular shape desired of the final object. Thus if the final object is to be square, the rubber is shaped to a similar square; similarly, if the final object is to be a tube, the rubber is shaped to the form of a tube.

The size of the shaped rubber at this stage is determined by the volumetric expansion which the rubber is to experience. We have found that according to the formulae to be set forth, we obtain substantially a volumetric expansion of 800 per cent; viz., the expanded object is eight times the size of the original rubber. Thus we form the rubber with the blowing agent to the shape of the final desired object of a size one-eighth of the final desired object to be formed. We shall refer hereinafter to this original small shaped object of the unexpanded rubber and chemical blowing agent mix as a miniature.

The miniature rubber object is then placed within a mold that tightly confines it, the mold being of the same size as the miniature and of the shape of the final object. The rubber miniature, tightly confined in the mold, is then subjected to sufficient heat to vulcanize the rubber and to set off the chemical blowing agent by heat decomposition to effect the evolution of gas or gases from the chemical blowing agent. The heating is continued until the rubber is cured and when the vulcanization has been completed and the chemical blowing agent thoroughly decomposed to effect the evolution of the expanding gases, the rubber miniature is released from the mold which confines it and is allowed to expand to its final size and shape. The expansion is effected by the evolved gas which has been held within the rubber by the confining mold. When released the rubber miniature is still hot and the rubber is hence in a plastic stage so that it is capable of such expansion. The rubber mix still has a relatively low percentage of sulphur, of the order of from 2 to 10 per cent, so that the final product is a soft or flexible rubber. The evolved gas under the pressure in the rubber miniature effects a volumetric expansion of the vulcanized rubber and we have found that the rubber miniature expands without losing its shape in accordance with the predetermined expansion to a final object of the desired size and shape.

It is the object of our invention to provide a novel one-stage process for the manufacture of closed cell gas expanded rubber using a chemical blowing agent within the rubber.

It is a further object of our invention to provide a novel process for the manufacture of closed cell gas expanded rubber using a single mold in which the rubber is vulcanized and the gas released.

It is a further object of our invention to provide a process in which we impart to rubber containing a blowing agent the shape of the final object desired in a miniature form and to effect the decomposition of the chemical blowing agent and the consequent evolution of gas from the blowing agent and the vulcanization of the rubber in this confining mold.

It is a further object of our invention to provide a new and simple method for the manufacture of soft closed cell gas expanded rubber in a one-stage process.

Further objects of our invention will become apparent from the detailed description taken in connection with the drawing which is to follow.

Figure 1:
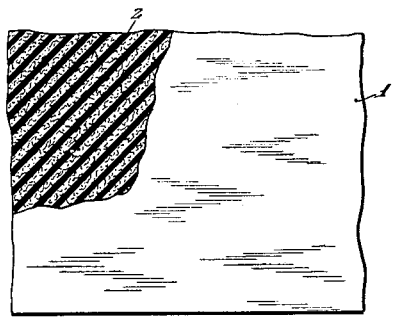
Figure 1 is an elevation of a mass of rubber.
Figure 2:
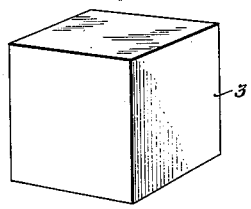
Figure 2 is a perspective view of a rubber miniature cut from the mass of rubber shown in Figure 1.
Figure 3:
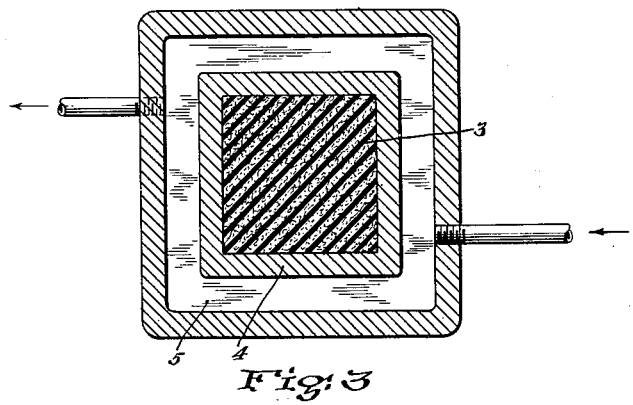
Figure 3 is a side elevation of a mold in which the rubber miniature is confined and vulcanized.
Figure 4:
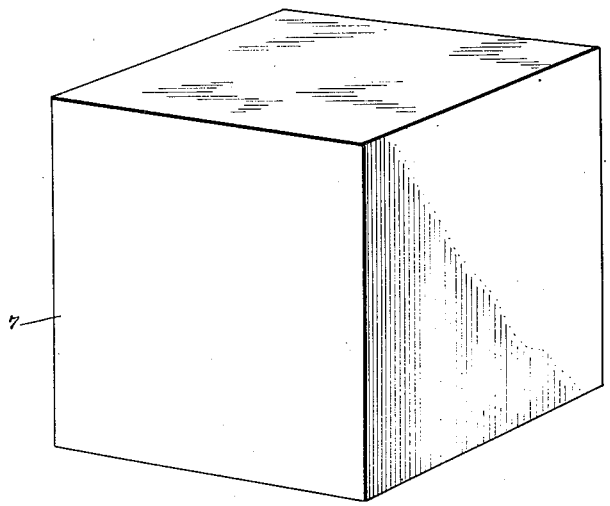
Figure 4 is a perspective view showing the expanded rubber object after it has been vulcanized, released from the mold and expanded.

Referring now more particularly to the drawing, in Figure 1 is shown a mass of rubber 1 with chemical blowing agent 2 homogeneously dispersed throughout the mass of rubber. Figure 2 shows a small block 3 cut from the rubber mass 1 to the desired size and shape. Figure 3 shows the rubber miniture 3 confined within a mold 4 heated by a chamber 5. Figure 4 shows an expanded block of closed cell gas expanded rubber 7 which has been expanded from the rubber miniature 3 after the vulcanization of the miniature and the concurrent evolution of gas from the chemical blowing agent contained therein.

We shall now set forth certain formulae which we employ in the process of our invention.

I

Ingredients: Parts
- Rubber _____ 100
- Sulphur _____ 3 to 6
- Amino guanyl urea _____ 8 to 10
- Stearic acid _____ 7 to 9

II

Ingredients:
- Rubber _____ 100
- Sulphur _____ 3 to 6
- Aryl diazo guanyl urea _____ 8 to 10
- Stearic acid _____ 7 to 9

Although we have particularly set forth chemical blowing agents of the amidine type, we may employ any suitable chemicals which evolve desirable gases. Preferably, chemical blowing agents are employed which evolve nitrogen or similar inert gas or mixtures of nitrogen and ammonia.

The article of our invention can be distinguished by the fact that in the final product a residue of the chemical blowing agent is contained within the cells after the expansion has been effected.

By the term "rubber" used throughout the specification we include compounded or uncompounded rubber, natural rubber and rubber substitutes such as polymers of diolefines with conjugated double bonds, mixed polymers of such hydrocarbons and other unsaturated compounds, the reaction products of metal sulfides and polysulfides on organic polyhalogen compounds and the like.

Our invention is not to be confined purely to rubber but may also be applied to mixtures of rubber and suitable plastics or even bituminous materials and the like. Further, our invention may be applied not only to rubber but also to plastics which may be expanded in accordance with the process set forth. Such plastics include cellulose esters, cellulose ethers, mixed cellulose esters, synthetic resins, such as the vinyl and acrylic compounds, alkyd resins, and condensation products of urea and formaldehyde, and phenol and aldehydes, and the like.

Specifically, we carry out our invention by forming a mixture as above set forth in Formulae 1 and 2 and thoroughly incorporate the sulphur and chemical blowing agent in the rubber, preferably on a mill. After the mix has been thoroughly milled we shape a portion of the rubber into the desired shape as by extruding the rubber or, as indicated, by cutting with a die or cutting by any suitable means, and, in fact, we do not intend to restrict ourselves to any particular method of shaping the rubber. The rubber is shaped to substantially the size of the rubber miniature. When an 8 to 1 expansion is obtained, the rubber miniature is ⅛ the size of the final object. Further, although the rubber miniature should be preferably of substantially the shape of the final object, inasmuch as this shape is imparted to it in the mold which confines it, it is not necessary that the shape of the miniature conform to the shape of the final object. The size of the miniature, however, should be, as indicated, proportional to the size of the final object in the ratio of the expansion to be obtained.

The rubber miniature is then placed in a mold which tightly confines it. Thus the rubber miniature should be of the size of the mold and the mold should be adapted to closely hold the rubber. Any desired type of mold may be employed and any desired pressure means be used. The mold must have provision for heating and this heat can be effected either by the passage of hot fluids through chambers in the mold or by any suitable heating means as, for example, electrical coils.

By way of specific example, we employ for the mixtures above set forth 55 pounds of steam in the mold for 30 minutes to accomplish the vulcanization and to set off the chemical blowing agent. This heat effects a thorough evolution of the gas and the gas is held under compression within the rubber. Immediately upon the release of the rubber miniature from the confining mold it effects the expansion of 8 to 1 and assumes the size of the final object.

The operating economies of a process such as is set forth are believed obvious. The elimination of the steps of partial vulcanization and two-stage molding with the attendant expenses involved in the multiplicity of apparatuses and the time periods involved, are of marked commercial importance. The manufacturing cost of closed cell rubber is a substantial factor in determining the cost of the finished product. With the elimination of much of the manufacturing operations as accomplished by the present process, the cost may be substantially reduced. Inasmuch as this closed cell rubber by its valuable inherent properties, as have been set forth, is rendered particularly adaptable for large scale use in many different fields, it is imperative that its cost be at such a level as to enable it to compete with low-priced insulation materials now available.

The volumetric expansion depends on the factors of amount of gas evolved from the chemical blowing agent and the amount of chemical blowing agent actually employed in the rubber, and also the amount of heat used, which may determine the quantity of decomposition of the chemical blowing agent. This amount of volumetric expansion, whether it be 5 to 1, 8 to 1, or 12 to 1, may easily be determined, however, and when determined the volumetric expansion, as has been pointed out hereinbefore, controls the size of the rubber miniature.

To effect the combination of the rubber with extraneous objects, such objects may be contacted with the rubber during its expansion period so that the rubber expands into firm contact therewith. Thus, for example, a band can be placed about the rubber miniature as it expands and be thus firmly bonded to the final expanded object. Similarly, other materials could be joined to the rubber.

In lieu of a rigid confining mold, we may employ a gaseous counterpressure. In this modification a mix of rubber, vulcanizing agent and chemical blowing agent is shaped to the miniature form of the final article desired and subjected to a counterpressure of a gas such as nitrogen which holds it as tightly as would a rigid confining mold of metal while it is subjected to sufficient heat to vulcanize the rubber and to decompose the chemical blowing agent, thus evolving gas therefrom. After the rubber has been vulcanized, and while it is still hot, the counterpressure of the gas is released and the rubber expands under the influence of the blowing agent to the final size desired. This volumetric expansion may be of the order of 8 to 1. By using the confining gaseous counterpressure as here disclosed, we provide a one-stage process for the manufacture of gas expanded rubber, specifically closed cell gas expanded rubber. No final mold is needed, thus effecting the operating economies discussed above.

Although we have specifically dealt with the manufacture of relatively flexible closed cell gas expanded rubber according to the process which we have set forth above, we have also found that we may form semi-rigid or rigid closed cell gas expanded rubber with but slight modifications in this process. To form such rigid closed cell gas expanded rubber we employ relatively large amounts of sulphur, that is we may employ as high as fifty parts of sulphur per one hundred parts of rubber. The hard rubber mixes per se are known.

When we use a hard rubber mix we add a chemical blowing agent in suitable quantities to the hard rubber mix and confine the mix in a mold which is subjected to sufficient heat to almost completely vulcanize the rubber, but definitely not to complete the vulcanization. The heat, however, decomposes the chemical blowing agent and the gas is held under pressure in the rubber. When the mold that confines the miniature is released, the rubber expands rapidly to its final shape. In cases of the formation of closed cell rubber in which surface finish and exact contour is not a prerequisite, as in the formation of large slabs of rigid closed cell rubber, this method is very effective.

After the almost completely vulcanized rubber miniature has expanded to the final shape, or during such expansion, it is placed in a heated chamber and vulcanized to a final set without the necessity for the use of molds. The hard rubber formed in this way often has a surface blister caused by the explosion of certain of the closed cells along the surface because of the lack of final confining molds, but these blisters do not impair the properties of the final product since the number of erupted cells is relatively small and of no moment.

The vulcanization in this process is carried out in two separate stages. The preliminary vulcanization is more than a precure, however, and decomposes a substantial quantity of chemical blowing agent and carries the cure of the rubber to near its final stages. The mold is released, however, while the rubber is still hot and plastic, and, therefore, it can effect its expansion to final size before any setting takes place.

Although we have specifically set forth this invention with regard to the manufacture of closed cell gas expanded rubber, it is to be understood that it is equally applicable to rubber substitutes and rubber derivatives and plastic materials generally or in combination with rubber. Examples of such plastic materials are cellulose derivatives, such as cellulose acetate or cellulose nitrate, and synthetic resins such as the vinyl compounds or the acrylic acid derivatives or phenol or urea condensation products or other similar resin plastics.

Although we have set forth the specific process in detail, it is to be understood that certain modifications can be effected within the scope and spirit of our invention, and we do not intend to be limited except by the appended claims.

We claim:

1. The process of producing closed cell gas expanded material which comprises mixing rubber with a vulcanizing agent and a blowing agent, shaping the mix to the shape of the final article desired but in miniature size, confining the mix in a mold, heating the mix to vulcanize the rubber and decompose the blowing agent, releasing the vulcanized rubber from its confinement while it is still hot, and expanding the rubber to the final size and shape by means of the gas internally developed by the decomposition of the chemical blowing agent.

2. The process of producing soft and flexible closed cell gas expanded material which comprises mixing rubber with a relatively small amount of vulcanizing agent and a chemical blowing agent, confining the mix, heating the mix to vulcanize the rubber and decompose the blowing agent, releasing the vulcanized rubber from confinement while it is still hot, and expanding the rubber to the final size and shape.

3. The process of producing rigid closed cell gas expanded material which comprises mixing rubber with a relatively high amount of vulcanizing agent and a blowing agent, confining the mix, heating the mix to vulcanize the rubber and decompose the blowing agent, releasing the rubber from confinement while it is still hot, expanding the rubber to substantially final size and shape and applying further heat to the expanded closed cell rubber until the rubber obtains the desired state of rigidity.

4. The process of producing rigid closed cell gas expanded rubber which comprises mixing rubber with a relatively high amount of vulcanizing agent and a blowing agent, shaping the mix to the shape of the final article desired but in miniature size, confining the mix in a mold, heating the mix to vulcanize the rubber and decompose the blowing agent, releasing the vulcanized rubber from confinement while it is still hot, expanding the rubber to substantially final size and shape, and heating the expanded rubber without confinement until the rubber attains the desired state of rigidity.

LESTER COOPER.
DUDLEY ROBERTS.